United States Patent
Pogue et al.

(10) Patent No.: US 7,787,142 B2
(45) Date of Patent: Aug. 31, 2010

(54) METHOD AND SYSTEM FOR DESIGNING THE COLOR OF A COATING COMPOSITION ON AN ARTICLE

(75) Inventors: Robert T. Pogue, Pittsburgh, PA (US); Edward R. Millero, Gibsonia, PA (US); Robert A. Montague, Shelby, NC (US); Shelley D. Sturdevant, Harwick, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 2377 days.

(21) Appl. No.: 10/434,859

(22) Filed: May 9, 2003

(65) Prior Publication Data

US 2005/0090919 A1   Apr. 28, 2005

(51) Int. Cl.
*H04N 1/40* (2006.01)
(52) U.S. Cl. .................................... 358/1.16; 358/1.13
(58) Field of Classification Search ................ 358/1.13, 358/1.16; 345/582–594, 629–630
See application file for complete search history.

(56) References Cited

U.S. PATENT DOCUMENTS

| | | | | |
|---|---|---|---|---|
| 5,977,983 A * | 11/1999 | Einkauf et al. | ............... | 345/582 |
| 6,628,290 B1 * | 9/2003 | Kirk et al. | .................... | 345/506 |
| 6,717,584 B2 * | 4/2004 | Kulczycka | ................... | 345/589 |
| 6,847,364 B1 * | 1/2005 | Dichter | ........................ | 345/473 |
| 6,897,871 B1 * | 5/2005 | Morein et al. | ................ | 345/501 |
| 2003/0032482 A1 * | 2/2003 | Nagayama | .................... | 463/42 |

OTHER PUBLICATIONS

Printout of Website: http://www.datacolor.com/color_experts_008.shtml dated Feb. 3, 2003 (8 pp.).

* cited by examiner

*Primary Examiner*—Thomas D Lee
*Assistant Examiner*—Stephen M Brinich
(74) *Attorney, Agent, or Firm*—Julie W. Meder; Donald R Palladino

(57) ABSTRACT

A method of designing the appearance of an article having steps of creating a digital file of a design configuration for an article, representing the design configuration on a computer screen, selecting or creating a color for a coating composition to be applied to the article, generating color data for the created color, merging the color data with the digital file of the design configuration, and displaying on the computer screen an image of the article coated with the colored coating composition. Accurate calibration of the color of the article on a computer screen allows for production of coated articles based on the generated color data. The color data is further transmitted to a formulation computer that determines the formulation for a coating composition exhibiting the color data. Output from the formulation computer may be directly transmitted to a production facility for coating articles with the coating composition.

10 Claims, 2 Drawing Sheets

METHOD AND SYSTEM FOR DESIGNING THE COLOR OF A COATING COMPOSITION ON AN ARTICLE

FIELD OF THE INVENTION

The present invention relates to a method and system for designing the appearance of an article, more particularly, for designing the color of a coating composition on an article in which the color of the coating composition is designed on a computer screen which accurately displays the color of the final coating composition.

BACKGROUND OF THE INVENTION

Conventional development of the color for painted products, such as buildings, appliances, and the like occurs in a multi-step process involving numerous people. By way of example, the schematic shown in FIG. 1 depicts the multi-step process typically involved when an architect or designer selects the color for painted panels of a building. The designer identifies a color that the designer would like to have produced on building panels. The color may be shown on a sample article, such as a paint chip or a colored paper from a catalog or magazine. The designer takes the color sample to a panel producer and indicates that the building panels are to receive a paint having the color selected by the designer. The panel producer then contacts a paint producer for production of a paint that matches the color sample provided by the designer. The paint producer produces a sample of paint and provides it to the panel producer who then coats a sample panel with the sample paint and provides the sample painted panel to the designer. The designer reviews the sample of the painted panel. Frequently, the color of the painted panel sample does not meet with the color criteria of the designer and the process of creating another paint sample and painted panel with that paint sample must be repeated. This process of creating physical samples for review by the designer is often repeated many times over a period of weeks or even months until an acceptable color for the paint is achieved. Eventually, an acceptable paint color is produced by the paint producer and applied to a sample panel and accepted by the designer. Significant production time is lost between the point when the designer first identifies a color and communicates it to a panel producer and the point when the panels are ready for coating with the selected final paint composition. Both the panel producer and paint producer have expended significant time and effort with associated costs in producing the samples for approval by the designer.

A similar color development process occurs in the production of other colored articles, such as textiles, that are not coated with a paint yet are colored by other techniques, such as dyeing or pigmentation. However, articles bearing coating compositions are distinct from the colored articles that incorporate a color directly into the article (e.g., dyed textiles or extruded pigmented plastics) in that the coating compositions (frequently referred to herein as paint) are marketable alone or in combination with articles (e.g., painted building panels). Hence, a need remains for incorporating a digital color development system into a computer aided design system for production and design of painted articles.

SUMMARY OF THE INVENTION

The need is met by the system and method of the present invention for designing the appearance of an article. The invention includes steps of first creating a digital file of a design configuration for an article on a design computer, representing the design configuration on a computer screen, selecting on a color selection computer a color for a coating composition to be applied to the article, obtaining color data for the selected color, merging the color data with the digital file of the design configuration and displaying on the design computer an image of the article coated with the colored coating composition. The step of creating a digital file includes computer aided designing of the configuration, and the selected color is displayed on a computer screen and may be adjusted by a designer. The color data is generated by an algorithm in the color selection computer and may be any appropriate color generating data such as spectral data (e.g. percent absorbance), the hue, value, and chroma for the created color or L*a*b* values for the created color. The color data may include a color effect for the coating composition such as gloss or pearlescence. The selected color may account for the effect of a surface property of the article to be coated including surface color or surface texture. Articles that can be designed according to the present invention include, for example, buildings, vehicles, and appliances.

The invention further includes a formulation computer for determining the formulation of a coating composition having the generated color data. The formulation computer may include (i) a database containing color data and coating compositions associated with the color data and (ii) an algorithm for performing a best match of the generated color data with the color data in the database and identifying the formulation for the matched color data. Alternatively, the formulation computer may include an algorithm for calculating a formulation based on the generated color data.

The formulation for a coating composition having the color data may be provided to a dispensing system for producing the coating composition or for producing a sample of the article with the coating composition thereon. Alternatively, the formulation may be provided to a coatings production facility for commercial scale coating of the article.

DETAILED DESCRIPTION OF THE INVENTION

For purposes of the following description, it is to be understood that the invention may assume various alternatives and step sequences, except where expressly specified to the contrary. It is also to be understood that the specific devices and processes illustrated in the attached drawings, and described in the following specification, are simply exemplary embodiments of the invention.

The present invention relates generally to methods and systems for designing the color of a coating composition for an article. In the following discussion, the methods and systems are explained in reference to designing a coating composition, such as paint, for use on a building panel. However, it is to be understood that this is an exemplary use of the invention and should not be considered as limiting. The methods and systems of the invention can be practiced in the variety of fields utilizing colored coating compositions, such as in the manufacture of appliances, automobiles, furniture, and the like.

Figure 1:
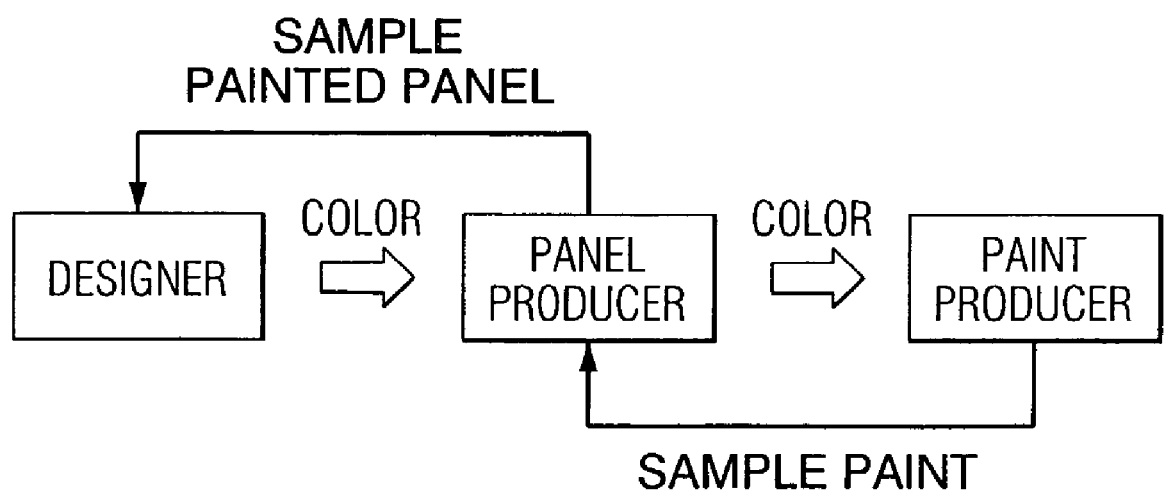
FIG. 1 is a flow chart of a method of selecting color for an article.
Figure 2:
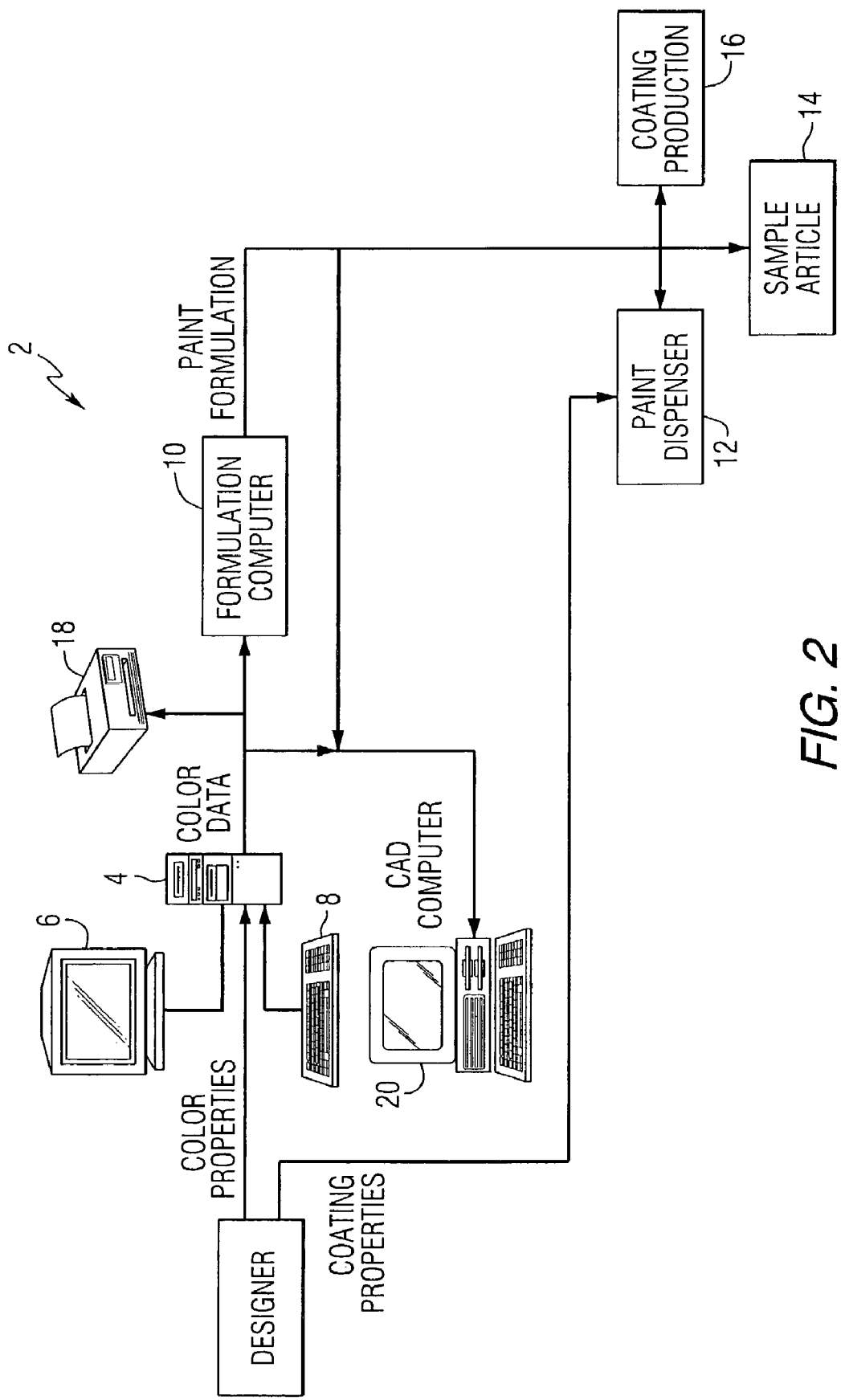
FIG. 2 is a schematic of a system for designing the appearance of an article according to the present invention.

One non-limiting embodiment of the system of the present invention is shown schematically in FIG. 2. The system 2 includes a color selection computer 4 typically having a computer screen 6 or monitor and an input device, such as a keyboard 8. Other input devices could be used, such as a hand-held input device, which could be in communication with the computer system either via direct wiring or through other means, such as the Internet and wireless means, e.g. via radio signals. All communications links for the transmission of data shown in the routes of FIG. 2 can involve one or more of the following non-limiting examples of communications links of hardwiring, keyboard entry, Internet connections and wireless communications. The color selection computer 4 includes a color algorithm for displaying and/or selecting a desired color by a designer and for adjusting the color on the computer screen 6 until an acceptable color is achieved. The computer screen 6 is calibrated so that a color shown thereon is accurately reproducible in a coating composition. Accurate representation of the desired color on the computer screen 6 ensures that the color selected by the designer on the computer screen 6 will be the same as or essentially the same as the color of the article bearing a coating composition exhibiting that color. In so doing, a designer has the ability to select a color on the computer screen 6 for the article without having to view paint chips or samples of a portion of the coated article (e.g. a painted panel).

The color algorithm generates color data for use in producing a coating composition. The color data generated by the color selection computer 4 may be in several forms, for example, spectral data or information on the position of the selected color in a color space. Spectral data for the color data may include data of the spectrum of visible light which would be absorbed (or reflected) by a coating composition having the selected color. Alternatively, the selected color may be characterized via hue, value, and, chroma or L*a*b* values of the CIELAB or Hunter Lab system where L* is a coordinate for lightness, a* is a coordinate for red to green (with a positive a* indicating red and a negative a* indicating green), and b* is a coordinate for yellow to blue (with a positive b* indicating yellow and a negative b* indicating blue). Significantly, as further discussed below, the designer is not limited to the existing colors in the database, but can use the information therein to actually create a unique color.

One output for the color data may be a coating composition formulation computer 10. In one embodiment, the formulation computer 10 contains a relational database listing coating compositions and formulations therefor, which are associated with color data. The formulation computer 10 includes an algorithm for providing a best match between the color data output from the color selection computer 4 with color data in the database and identifies the coating composition associated with the best matched color data of the relational database. Alternatively, the formulation computer 10 may include an algorithm that calculates the components of a coating composition (the formulation) which in combination would exhibit the color data of the selected color. The paint formulation determined by the formulation computer 10 may be transmitted to various output devices.

In one embodiment, the formulation computer 10 is in communication with a coating composition dispenser 12 for dispensing the formulation determined in the computer 10 into a container as a wet product. The coating composition dispenser 12 may also include an input device (not shown) for inputting data on the desired coating properties. By coating properties it is generally meant the physical properties of the coating composition. Nonlimiting examples of coating property data include durability, flexibility, and impact resistance. The formulation computer 10 may also be in communication with a sampling system 14 for dispensing a sample of the formulation onto a sample article as a dried or cured coating thereon. The sample article may be a small portion of the article to be coated, such as a small piece of building panel. In other instances, a paper sample of the color selected on the color selection computer 4 may be helpful. The color selection computer 4 may be in communication with a printer 18 to produce a paper sample of the selected color. Just as the computer screen 6 is calibrated to accurately display the selected color, so should the printer be calibrated to print a paper version of the selected color. The generation of paper samples or relatively small coated article samples produced by the present methods represents a significant reduction in time and costs as compared to current methods, which provides only for the production of coated article samples after much time and effort by numerous people. In addition, the samples produced by the present methods may be useful as a record of the formulation produced in the system 2. Moreover, the formulation computer 10 may be in communication with a coatings production facility 16 for coating the desired article with the formulation. It will be appreciated that output of the formulation computer 10 to a coatings production facility 16 avoids involvement of the designer in selection and approval of coatings samples so that the length of time to market of a finished product is greatly reduced. The coating property data may also be provided to the sampling system 14 or the coatings production facility 16 so that the coatings produced in either system exhibit the desired physical properties.

In addition, the system 2 can include a computer aided design (CAD) computer 20 for displaying a design configuration of a desired article, such as a building. By the phrase design configuration it is meant a design for the physical structure of an article. For example, in the design of exterior building panels, the article is a building and the design configuration is the architectural (structural) features of the building that are to be colored. The color selection computer 4 is in communication with the CAD computer 20 for transmission of the color data to the CAD computer 20. An algorithm in either the CAD computer or the color selection computer merges the color data with the design configuration of the displayed article. In this manner, the designer may view the completed article on a monitor of the CAD computer screen or color selection computer in its final form. The designer may then determine the acceptability of the selected color with high confidence. The formulation computer 10 may also be in communication with the CAD computer 20 such that the formulation determined in the formulation computer 10 may be transmitted to the CAD computer 20. In this embodiment, the designer has all information relating to the production of the designed article on the CAD computer 20 for future reference.

In use of the system 2, a user or designer selects or creates a color for a coating composition to be applied to an article. A color may be selected by choosing a preexisting color from a database of colors available in the color selection computer 4. Alternatively, a color may be selected by creating a new color using color development software on the color selection computer 4 which allows a designer to produce a new color. The designer may adjust the displayed color until a desired color is achieved. The color selection computer 4 creates color data for the desired color. The color data is created by an algorithm in the color selection computer 4 and may be one of (i) the hue, value, and chroma for a color of a coating composition exhibiting the desired color, (ii) the L*a*b* values for a color of a coating composition exhibiting the desired color, or (iii) spectral data (e.g., absorbance) in the visible light spectrum for a color of a coating composition exhibiting the desired color. The desired coating composition may have a color effect, such as gloss, pearlescence or metamerism. In such instances, the designer inputs additional information on the selected color to the color selection computer 4 to specify a desired color effect. In this manner, the color data generated by the color selection computer 4 includes information relating to the color effect for a coating composition exhibiting the selected color with color effect. Hence, all color specifications for a coating composition (color and color effect) may be input to the color selection computer 4 and converted via the color algorithm to a complete set of color data for producing the desired appearance of the coating composition.

The substrate to which the coating composition is to be applied can impact the appearance of the coating composition. Hence, the designer may also input information regarding the substrate (e.g., color and/or texture) to the color selection computer 4. The color algorithm for obtaining color data accounts for the substrate information so that the selected color displayed on the color selection computer 4 will be accurately reproduced in a coating composition applied to the substrate.

The method and system of the present invention may be used to generate color samples or coating composition samples, to produce coating compositions or to produce coated articles. A color sample may be generated by printing an image of the displayed color directly from the color computer system 4 to the printer 18. Production of the coating compositions, samples thereof, or coated products involves an additional process of converting the color data to a coating formulation. This conversion step may occur in the color computer system 4 or at a remote site. Because coating formulations change frequently due to changes in the availability of components or changes in the components (e.g., a slight color shift in a pigment), it may be preferable to convert the color data to a coating formulation at a centralized, remote site. In this manner, multiple color computer systems (only one shown in FIG. 2) may transmit color data to a single formulation computer 10.

Where the formulation computer 10 includes a relational database of color data and coating formulations associated therewith, an algorithm in the formulation computer 10 searches for the best match between the color data transmitted from the color computer and color data in the database to identify a coating formulation. Alternatively, where the formulation computer 10 includes an algorithm for calculating coating composition formulations, the formulation computer 10 calculates the formulation for a coating composition that would be appropriate for exhibiting the color data generated in the color selection computer system 4.

The coating formulation identified in the formulation computer 10 (from matching in the database or as calculated) when prepared and applied to the article, exhibits the created color (including the color effect) and coating properties specified by the designer. The coating formulation may be produced into a sample and coated onto a sample article, such as in the form of a paint chip. The paint chip may be submitted to a third party for approval or may be used in designing other articles. Alternatively, the paint formulation may be provided directly to a coatings producer, prepared and applied to the article. Alternatively, the prepared formulation may be dispensed into a suitable container for future use. These methods provide for production of coating formulations based solely on the input of a designer and obviate the need for coated product samples.

Another advantage of the present invention is that the color data may be merged with a design configuration for the article. In one embodiment, the color data is transmitted from the color selection computer 4 to the CAD computer 20 or vice versa. The algorithm in the CAD computer 20 or color selection computer system 4 merges the color data into the CAD image viewed on screen. The designer is able to view a computer generated image of the final article having the desired color and properties of a coating composition thereon. If changes to the article or the coating composition are necessary based on the computer generated image, adjustments can be readily made until an image of an acceptable final article is produced. In addition, the underlying substrate of the article may have a surface property that can impact the color of a coating composition applied thereto. The step of creating a color may further account for the effect of such a surface property including surface color or texture. Finally, the formulation determined by the formulation computer 10 may be transmitted to the CAD computer 20 so that the designer has access to all information regarding the production of the article.

Therefore, we claim:

1. A system for designing the appearance of an article comprising:
    a design computer comprising computer aided design software for creating and displaying a digital file of a design configuration of an article, the article being a building or an appliance;
    a color selection computer having a display screen for designing and displaying a color of a coating composition for the article and an algorithm for generating color data for the displayed color;
    a display algorithm for merging the generated color data with the digital file of the design configuration to display the article having the designed color; and
    a formulation computer comprising an algorithm for calculating a formulation of a coating composition based on the generated color data.

2. The system of claim 1 wherein said display algorithm accounts for the effect of a surface property of the article to be coated.

3. The system of claim 1, wherein said surface property is surface color and/or texture.

4. The system of claim 1 wherein said formulation computer comprises (i) a database containing color data and coating compositions associated with the color data and (ii) an algorithm for performing a best match of the generated color data with the color data in the database and identifying the formulation for the matched color data.

5. A method of designing the appearance of a coated article comprising the steps of:
    (a) displaying on a computer screen a color for a coating composition to be applied to an article, the coating composition having coating properties;
    (b) generating color data for the displayed color and the coating properties;
    (c) transmitting the color data of step (b) to a remote computer having an algorithm for calculating a formulation for the coating composition having the color data, the formulation exhibiting the displayed color and coating properties when coated onto an article and calculating the formulation; and
    (d) providing the formulation to a dispensing system and dispensing the formulation.

6. The method of claim 5, wherein step (c) comprises:
    transmitting the color data of step (b) to a remote computer having a database of formulations for coating compositions associated with color data; and determining a best match between the generated color data and color data in the database to identify the formulation.

7. The method of claim 5 further comprising providing coating property data to the dispensing system.

8. The method of claim 7 wherein the coating property data comprises durability, flexibility and/or impact resistance.

9. The method of claim 5, wherein said dispensing step comprises coating the formulation onto an article.

10. The method of claim 5, wherein the output device is a computer having computer aided design software and step (d) comprises displaying an image of the article coated with the formulation on the design computer.

* * * * *